United States Patent Office 3,047,809
Patented July 31, 1962

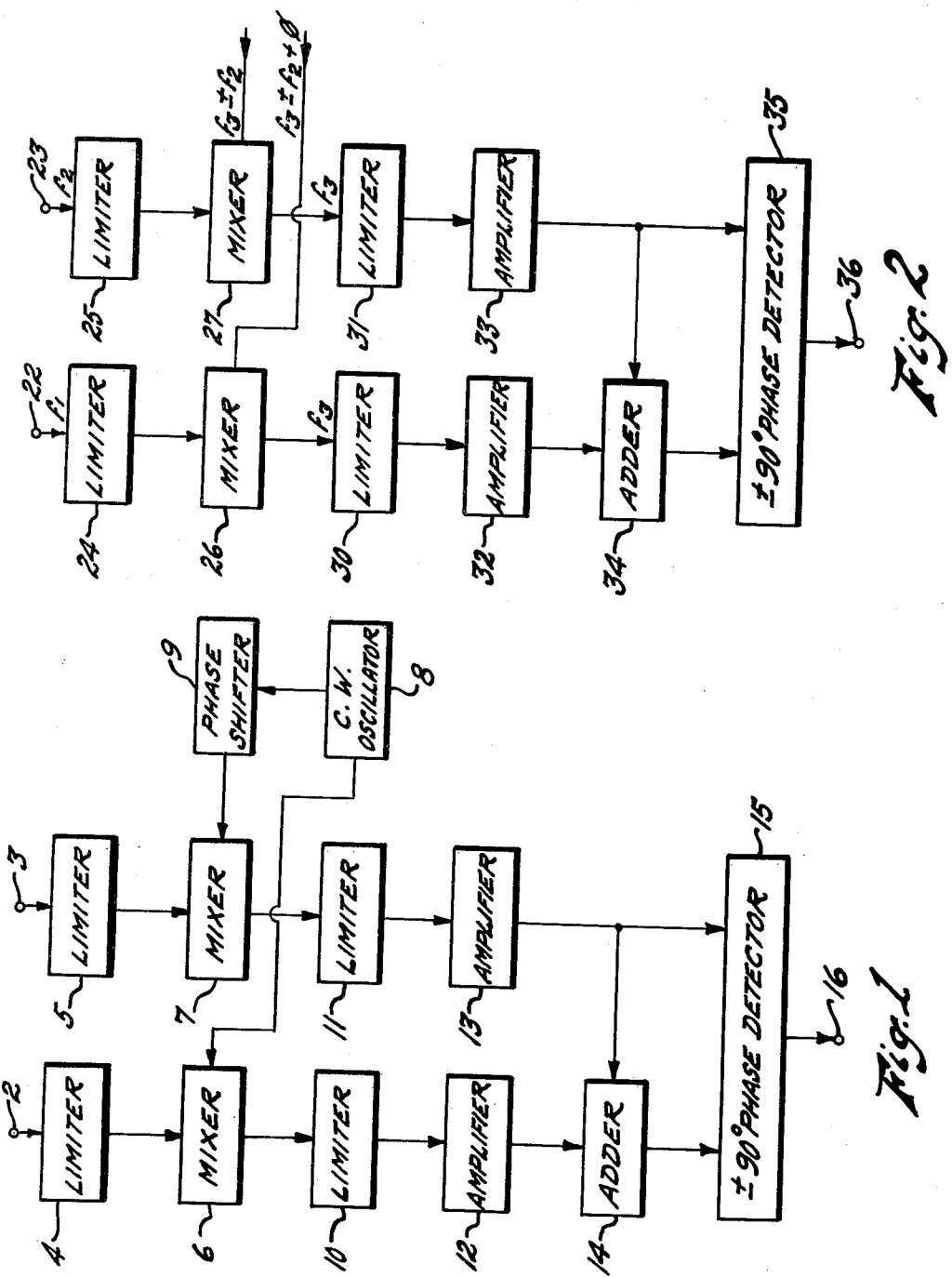

3,047,809
PULSE PHASE COMPARISON SYSTEM
Clarence E. Bergman, Fairfax County, Va., assignor to the United States of America as represented by the Secretary of the Air Force
Filed Apr. 22, 1960, Ser. No. 24,181
3 Claims. (Cl. 328—133)

This invention relates to a system for phase comparing one signal against another, and more particularly to a system including an intermediate frequency channel for each of aforesaid signals.

A radar such as the moving-target-indicator system utilizes the Doppler effect to eliminate permanent echoes while preserving echoes from a moving target. The phase of the echo signal existing in the intermediate-frequency amplifier system of a standard radar receiver is compared with the phase of a reference oscillator so operated that its phase is related in a definite way to the phase of a transmitted pulse. Therefore, a phase comparison is necessary. However, there are limitations in the phase comparison system. Any stray phase shift between the two intermediate frequency channels usually is corrected for by detuning the tuned circuits in the phase comparison circuit. But this correction introduces quadrature effects into the pulses, due to the non-symmetry of the pass bands. As a result, it is all but impossible to correct for the phase shifts and still maintain an output free of quadrature effects.

The present invention provides a novel system which eliminates all the aforementioned quadrature effects. The stray phase shift existing between two intermediate-frequency channels in the phase comparison system is compensated for in a novel manner. A first signal and a second signal to be phase compared are heterodyned to a new intermediate frequency. Simultaneously, one of the two aforesaid signals is phase shifted. Subsequently, there is also provided a unique mode of operation wherein the two signals having a new intermediate frequency are added. The summation thereof is then phase compared to one of the two aforesaid signals.

An object of the present invention is to provide a novel phase comparison system wherein one pulse signal is compared against another and quadrature effects are eliminated from the resultant signal.

Another object of the present invention is to provide a novel phase comparison system wherein a first pulse signal is added to a second and the summed signal is compared in phase to the second signal to derive a resultant signal which is equal to the difference between the phase of aforesaid first and second signal.

Still another object of the present invention is to provide a novel phase comparison system wherein a first signal and a second signal are heterodyned to a new intermediate frequency, and simultaneously one of aforesaid signals is shifted in phase.

Yet another object of the present invention is to provide a novel phase comparison system wherein a first intermediate signal and a second intermediate signal are heterodyned to a new intermediate frequency, simultaneously a phase shift is introduced in one of aforesaid signals, subsequently the first and second signals having the new intermediate frequency are added and the summation is then phase compared to one of the aforesaid new intermediate-frequency signals.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings:

FIG. 1 illustrates in block diagram form the present invention in which the two signals to be phase compared have the same frequency; and FIG. 2 shows in block diagram form the present invention in which the two signals to be phase compared are of differing frequencies.

Now referring to FIG. 1 in greater detail, there are shown two input terminals 2 and 3, which are adapted to receive a first and second pulse signal, respectively. The first and second pulse signals, having the same intermediate frequency, are fed into mixers 6 and 7, respectively, by way of limiters 4 and 5, respectively. Oscillator 8 feeds a continuous wave signal into mixer 6 and simultaneously feeds a continuous wave signal to mixer 7 by way of phase shifter 9.

Thus the first pulse signal is heterodyned to a new intermediate frequency pulse signal which is fed from mixer 6 to amplifier 12 by way of limiter 10. The second pulse signal has been heterodyned to a new intermediate frequency whose frequency is identical to the first, but also has been phase shifted. The second pulse signal, having a different phase to compensate for stray phase shift and heterodyned to a new frequency, is fed to amplifier 13 by way of limiter 11. From amplifiers 12 and 13, the output signals thereof are fed into adder 14, also from amplifier 13 a signal is fed into a simple ±90° phase detector 15. Phase detector 15 also receives the summation signal from adder 14. The resultant signal from phase detector 15 is available at output terminal 16.

It is to be noted that two signals are fed into adder 14, one being from amplifier 12 and hereinafter referred to as signal A and one from amplifier 13, designated as signal B. Signals A and B are summed in adder 14 and are fed into a simple ±90° phase detector 15. Also fed into phase detector 15 is signal B. As the angle between signals A and B and signal B is one half the angle between signals A and B, the overall phase detector then has a maximum range of ±180 degrees.

As noted hereinbefore, in the prior art there existed stray phase shifts between the two intermediate-frequency channels which was corrected by detuning the tuned circuits in the phase comparison system. This correction introduced quadrature effects into the pulses, due to the non-symmetry of the pass bands. As a result, it was all but impossible to correct for phase shifts and still maintain an output free of quadrature effects. The present invention eliminates this problem through the use of a phase shifter in the C.W. circuitry. Any phase shift in the C.W. circuitry, through the mixing action, is introduced into the signal channels. Thus, any phase shift in the two signal channels up to the adder is easily corrected by the C.W. phase shifter with no loss of performance. The stray phase shift in the channels following the adder presents another problem, however. Assume the phase shift in adder 14 is $\alpha$ and that the input phase shift desired to be measured is $\psi$. The angle actually measured is then $$2X\left(\frac{\psi}{2}-\alpha\right)=\psi-2\alpha$$

This can be corrected by introducing a phase shift of $2\alpha$ into the system by means of C.W. phase shifters. The performance of the present phase comparison system is perfectly all right, except that the useful phase range of the system is reduced by a factor of $2\alpha$. This enables the overall system to operate up to $180°-2\alpha$ in one direction, and to $180°+2\alpha$ in the other. However, for the most applications, this effectively limits the device to $\pm(180°-\alpha)$. For the small values of $\alpha$ which are present, this reduction in range is negligible.

Now referring to FIG. 2, there is shown a block diagram of the present invention in which the pulse signal fed into terminal 22 is of a different frequency ($f_1$) than the one ($f_2$) fed into terminal 23. The mixing arrangement shown in FIG. 2 may be utilized so that the signal fed into mixer 27 is composed of a signal equal to $f_3 \pm f_2$ and the signal fed into the mixer 26 is composed of $f_3 \pm f_2 + \phi$. Then the signal to limiter 30 from mixer 26 has a frequency of $f_3$. The signal from mixer 27 to limiter 31 has a frequency of $f_3$ also. The operation of the remainder of the system is identical to that for FIG. 1.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may be used to advantage without a corresponding use of the other features.

Having now described my invention, what I claim as new and desire to secure by Letters Patent, is as follows:

1. A phase comparison system to compare a first intermediate frequency pulse signal to a second comprising an input circuit for each of said pulse signals, each of said input circuits including a limiter, a pair of mixer means, one of said mixer means receiving the output signal from one of said limiters, and the other of said mixer means the output signal from the other of said limiters, means to generate a continuous wave signal for one of said mixers, means to phase shift said generated continuous wave signal prior to application thereof to the other of said mixer means, means to add the output signal from each of said mixers, and means to phase compare said added signal to one of said output signals.

2. A phase comparing system to compare a first intermediate pulse signal to a second comprising an input circuit for each of said pulse signals, each of said input circuits including a limiter, a pair of mixers, one of said mixers receiving the output signal from one of said limiters and the other of said mixers receiving the output signal from the other of said limiters, means to generate a continuous wave signal, said generated signal being received directly by one of said mixers and being received by the other of said mixers by way of a phase shifter, means to limit each of the output signals from each of said mixers, means to add each of the limited output signals to the other, and means to phase compare said added signal to one of said limited output signals.

3. A phase comparison system to compare a first intermediate frequency pulse signal to a second comprising an input circuit for each of said pulse signals, each of said input circuits including a limiter, one of said limiters receiving said first intermediate-frequency pulse signal and the other of said limiters receiving said second intermediate-frequency pulse signal, means to heterodyne each of said limited signals to another frequency, means to phase shift one of said two signals during said heterodyning operation, means to add said pair of pulse signals after said heterodyning operation and means to compare said added signal to one of said pair of heterodyned signals.

References Cited in the file of this patent
UNITED STATES PATENTS 2,731,566    Chalhoub _____ Jan. 17, 1956